UNITED STATES PATENT OFFICE.

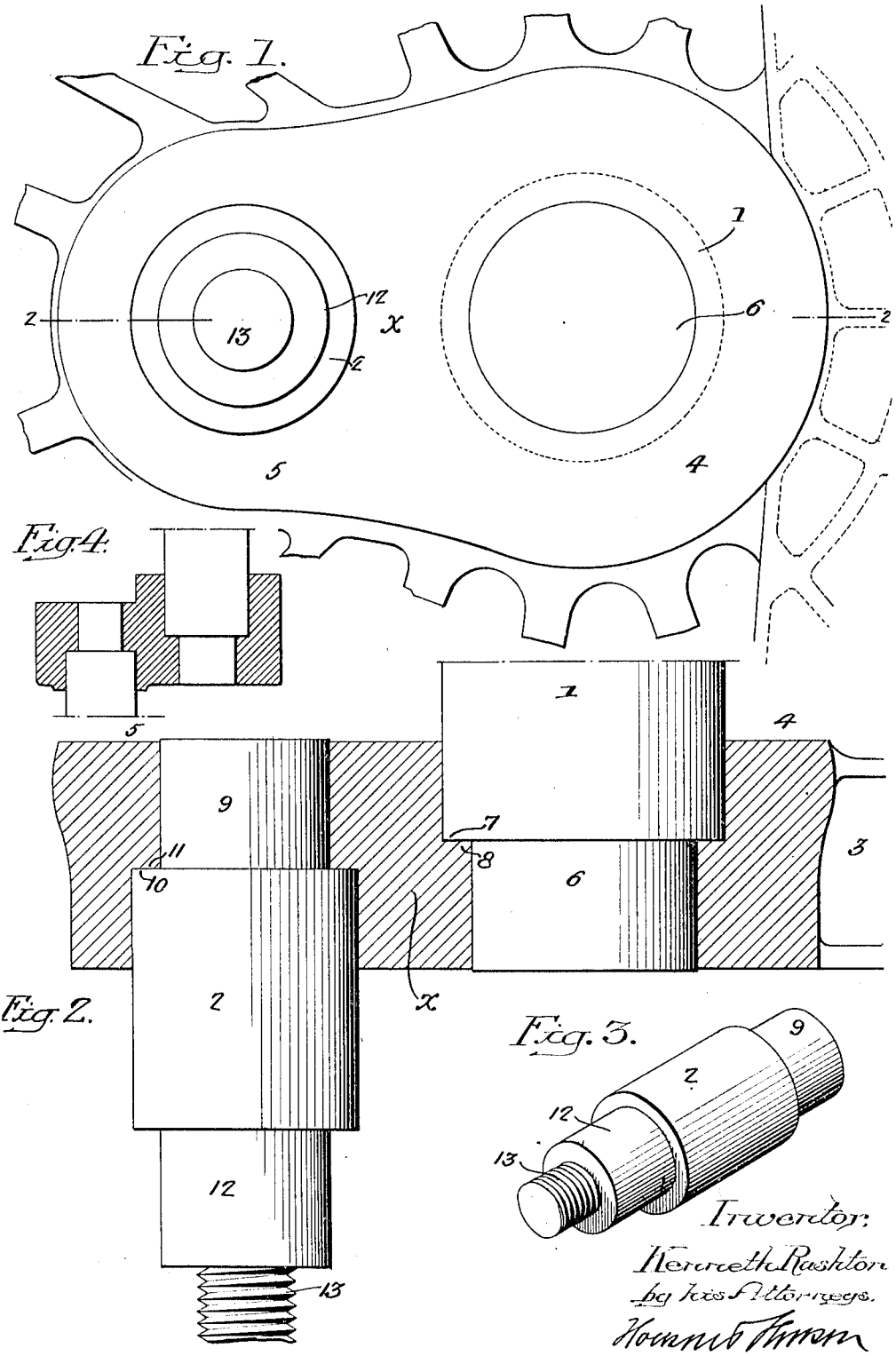

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

DRIVING-WHEEL AND CRANK.

1,313,737.   Specification of Letters Patent.   Patented Aug. 19, 1919.

Application filed May 12, 1919.   Serial No. 296,581.

*To all whom it may concern:*

Be it known that I, KENNETH RUSHTON, a citizen of the United States, residing in Philadelphia, Pennsylvania, have invented certain Improvements in Driving-Wheels and Cranks, of which the following is a specification.

My invention relates to certain improvements in the construction of the axle and the wrist pin of a driving wheel of a locomotive, or crank.

The object of my invention is to construct the axle and the wrist pin so as to provide sufficient metal between the two elements when a comparatively short stroke is desired, in order that the hub of the wheel or the crank will not be weakened to any appreciable extent.

In the accompanying drawings:

Figure 1 is a front view of the hub of a driving wheel of a locomotive illustrating my invention;

Fig. 2 is a sectional view on the line 2—2, Fig. 1;

Fig. 3 is a perspective view of the wrist pin; and

Fig. 4 is a sectional view of a crank illustrating my invention.

1 is the driving axle. 2 is the wrist pin and 3 is the wheel having a hub 4. This hub is extended in the form of a crank, as at 5, to form a bearing for the wrist pin 2.

In large locomotives, driving axles of large diameters must be used and the wrist pin is also comparatively large so that if the pins were constructed in the ordinary manner the metal in the space $x$ between the wrist pin and the axle would be reduced to such an extent as to weaken this part of the hub. In order to obviate this difficulty, I reduce the axle 1 at the end 6, forming a shoulder 7 and the opening in the hub for the axle is shaped to correspond to the two diameters of the axle forming a shoulder 8 at the center of the hub. I also reduce the wrist pin 2 at 9, forming a shoulder 10. The opening in the extension 5 of the hub is shaped to correspond with the wrist pin and has a shoulder 11 against which the shoulder 10 of the wrist pin bears. This enables me to use a large diameter axle and a large diameter wrist pin without materially reducing the metal between the wrist pin and the axle, as the large portion of the wrist pin is opposite the reduced portion of the axle, and the reduced portion of the wrist pin is opposite the enlarged portion of the axle. The outer end of the wrist pin is reduced at 12 and has a threaded portion 13 for the reception of the nuts and washers which hold the end of the connecting, or parallel, rod in position on the wrist pin.

While I have illustrated my invention, in Figs. 1 and 2, as applied to the hub of the driving wheel of a locomotive, it will be understood that it can be used in connection with the cranks of locomotives, or other machines, as shown in Fig. 4, where it is essential to have a large diameter axle, or shaft, and a comparatively large wrist pin and where the stroke is comparatively short.

I claim:

1. The combination of a crank arm; an axle having a reduced portion; a wrist pin, also having a reduced portion, both the axle and the wrist pin being adapted to the crank pin, the enlarged portion of the wrist pin being opposite the reduced portion of the axle.

2. The combination of a locomotive driving wheel having a hub; an extension of the hub forming a crank; an axle having a reduced portion, the said axle being adapted to a shouldered opening in the hub; a wrist pin having a reduced pin and mounted on the opposite side of the crank portion of the hub from the axle, the reduced portion of the wrist pin being opposite the large portion of the axle, while the large portion of the wrist pin is opposite the reduced portion of the axle.

In witness whereof I affix my signature.

KENNETH RUSHTON.

Copies of this patent may be obtained for five cents each, by addressing the "Commissioner of Patents, Washington, D. C."